2,904,545
Patented Sept. 15, 1959

1

2,904,545

21-DIAZO PREGNENES

Tadeus Reichstein, Albert Wettstein, Georg Anner, Jean-René Billeter, and Karl Heusler, Basel, Robert Neher, Binningen, Julius Schmidlin, Basel, Hellmut Ueberwasser, Riehen, and Peter Wieland, Basel, Switzerland; said Wettstein, said Anner, said Billeter, said Heusler, said Neher, said Schmidlin, said Ueberwasser, and said Wieland, assignors to said Tadeus Reichstein No Drawing. Application January 5, 1955
Serial No. 480,061

Claims priority, application Switzerland January 15, 1954
8 Claims. (Cl. 260—239.55)

Serial No. 444,657, filed July 20, 1954, by T. Reichstein

2 et al., now Patent No. 2,862,851, describes the isolation and purification of aldosterone, a new, biologically highly active compound from adrenal glands. In another Serial No. 454,834, filed September 8, 1954, by T. Reichstein et al., now Patent No. 2,862,925, the functional derivatives of aldosterone are described. Aldosterone was found to have two hydroxyl groups, one of which can be esterified more readily than the other.

The reactions described in the present application made it possible to ascertain the constitution of aldosterone. The more important results are represented by this diagram of formulae:

Aldosterone

Aldosterone monoacetate (more readily esterifiable hydroxyl group is acylated)

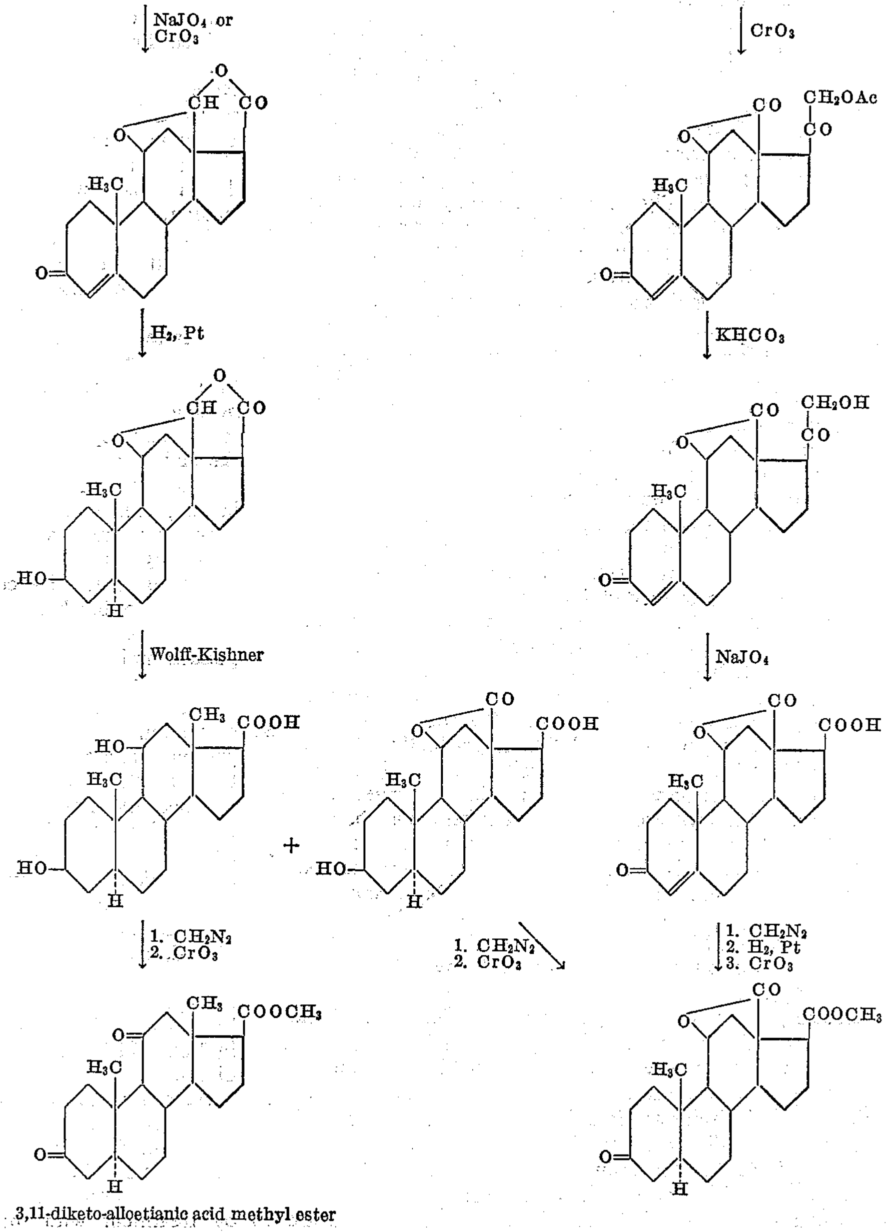

3,11-diketo-alloetianic acid methyl ester

Instead of aldosterone, there may be used as starting material functional derivatives thereof in which both hydroxyl groups are free or in which one hydroxyl group is functionally converted, preferably esters, or ethers, enol esters, enol ethers, acetals, or their corresponding thio derivatives, such as thio ethers and thio acetals.

By the degradation reactions shown in the above diagram of formulae, aldosterone has the following formulae which obviously represent an equilibrium

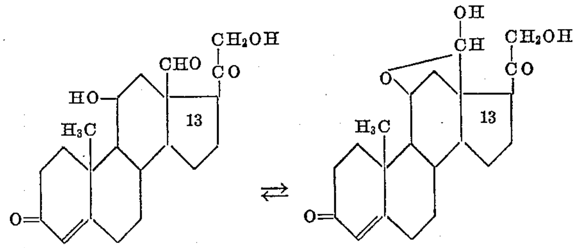

These formulae show that aldosterone and its functional derivatives are 3,11-dioxygenated pregnane compounds or functional derivatives thereof, in which the radical in 13-position is a free or functionally converted aldehyde group. Furthermore, it was possible to prove the constitution of aldosterone by the process for the manufacture of such compounds as described below.

Steroids of this kind are obtained when in 3-oxygenated, specially 3,11-dioxygenated steroid-17-carboxylic acids, or their functional derivatives, in which the radical in 13-position is a free or functionally converted aldehyde group or a radical convertible thereinto, the radical in the 17-position is converted into the acetyl group or into the free or a functionally converted hydroxy acetyl group; e.g. halides of the acids mentioned are reacted with diazo methane; or methyl metal compounds are caused to act on functional derivatives, such as halides, esters, acid amides or nitriles; a free or functionally converted hydroxyl group is introduced into the 21-position of the compounds obtained or a substituent present in the 21-position is converted into such group, or any substituent in 21-position is replaced by hydrogen, or a methylene grouping at carbon atom 20 is oxidized into an oxo group, if desired, a free or functionally converted hydroxyl group is introduced into the 17-position, if there is no free or functionally converted aldehyde group in 13-position, no oxo group in 3-position, and no double bond in 4,5-position, these are formed, if desired, at any stage of the process, and free or functionally converted hydroxyl or oxo groups are converted into one another.

In carrying out the reactions of this process per se conventional methods may be followed. Thus the reaction of the acid halides with diazo methane can be carried out with an excess of the latter to obtain the diazo ketones, hydrogen halide being split off. On the other hand, when the diazo methane solution is gradually added to the acid halide, the hydrohalic acid liberated during the condensation reacts with the intermediately formed diazo ketone, and the corresponding halogen ketone is obtained.

For the replacement of the halogen atoms or the diazo group in the resulting ketones by hydrogen a large number of reducing agents are suitable, for example, metals, such as zinc, copper, magnesium or their alloys in the presence of any of a wide variety of solvents, such as alcohols, aqueous alcohols, lower aliphatic acids, hydrohalic acids, or alkalis. Reductions of this kind are often carried out electrolytically or with hydrogen catalytically activated, e.g. with nickel, palladium or platinum. Finally, it is also possible to effect the reduction with aluminium amalgam or sodium amalgam, zinc palladium, alkali iodides and glacial acetic acid, sodium and alcohols, disubstituted anilines or with combinations of the above reducing agents. The reduction proceeds especially easily in the case of the 21-iodinated products.

To form hydroxy ketones, diazo ketones obtained are treated, either in the crude state or after separation and purification, with hydrolyzing agents, for example, water or dilute acids, as e.g. sulfuric acid, or with organic sulfonic acids, such as methane sulfonic acid or toluene sulfonic acid. Esters of the hydroxy ketones can be obtained by reacting the diazo ketones with organic or inorganic acids having a low water content, for example, acetic acid, or with propionic acid, butyric acid, trimethyl acetic acid, crotonic acid, oenanthic acid, palmitic acid, benzoic acid, phenyl acetic acid, β-cyclo-pentyl propionic acid, hydrochloric acid, hydrobromic acid, hydriodic acid, phosphoric acid, or boric acid. When halogen ketones are obtained as intermediate products, they can be converted by means of alkaline agents, for example bicarbonates, into the free hydroxy ketones or by means of salts of the aforementioned acids into their esters.

The hydroxyketones and their esters can also be obtained from the methyl ketones either directly or indirectly. Thus, they can be obtained with the aid of suitable oxidizing agents, for example lead tetracylates, such as lead tetracetate or aryliodoso acylates. It is also possible to halogenate the methyl ketones in 21-position directly, or indirectly by way of the 21-oxalyl derivatives, and converting the resulting halogen ketones into the hydroxy ketones or their esters, following the above directions.

According to this process, the acid halides mentioned can also be reacted with methyl metal compounds, for example those of magnesium, cadmium or zinc; there may also be mentioned compounds of mercury, copper, aluminium, tin and the alkali metals. There are thus obtained the methyl ketones which can be converted into the hydroxy methyl ketones in the afore-described manner.

When acid esters are converted with the methyl metal compounds, there are obtained, with the splitting off of water, from the intermediately formed carbinols compounds having a methylene grouping at carbon atom 20. The latter grouping can be replaced by an oxo group by means of oxidizing agents. There may be mentioned by way of example the oxidation with a compound of hexavalent chromium, such as chromic acid, with permanganate, by ozonizing and splitting the ozonide, by the action of peroxides, such as perbenzoic acid, monoperphthalic acid, or hydrogen peroxide, advantageously in the presence of osmium tetroxide and the splitting, for example by means of lead tetracetate or periodic acid, of the glycols formed in the hydrolysis of the oxide rings or by direct additive combination of 2 hydroxyl groups with the double bond.

In the reaction of the nitriles with methyl metal compounds imino compounds are obtained which can be hydrolyzed into ketones with hydrolyzing agents.

If desired, the free or functionally converted hydroxyl group can be introduced into the 17-position of resulting pregnane compounds by known methods at any stage of the process.

When the 13-position of the compound obtained is occupied by a radical which is convertible into a free or functionally converted aldehyde group, such as a free or functionally converted carboxyl group, especially a lactone group, or a free or functionally converted carbinol group, an agent suitable for this kind may be employed, such as e.g. a reducing or oxidizing agent. Depending on the reaction conditions 18,11-lactones, for example, are converted by means of alkali aluminium hydrides, such as lithium-aluminium hydride into 11-hydroxy-aldehydes or their cyclosemiacetals or 11,18-dioles.

According to this invention, a 3-, 11- and/or 18-positioned substituent convertible by hydrolysis into an oxo or hydroxyl group can be so converted at any stage of the process. For example, ketals and acetals, open chain as well as cyclic ones, e.g. ethylene ketals, can be split by treatment with mineral acids or sulfonic acids at room temperature, advantageously in the presence of a ketone, such as acetone or pyruvic acid, or by heating gently with dilute acetic acid. Under the same acid conditions, enol ethers or tetrahydropyranyl ethers are also split. Benzyl ethers can moreover be split easily with hydrogen in the presence of a catalyst, e.g. palladium on carrier substances, such as animal carbon or alkaline earth carbonates.

The conversion of the free hydroxyl groups into oxo groups is effected, e.g. by means of oxidizing agents, such as chromic acid in glacial acetic acid, or by dehydrogenating means, such as heating with copper powder, the action of metal alcoholates or metal phenolates in the presence of ketones, such as acetone or cyclohexanone.

Hydroxyl or oxo groups may also be functionally converted as described, e.g. in the aforementioned Serial No. 454,834, filed September 8, 1954, by T. Reichstein et al.

If the double bond must be introduced into the 4,5-position, this can be done in the usual manner, for example by halogenating and subsequently splitting off hydrogen halide.

Racemates obtained can be split into their antipodes by known methods at any stage of the process.

The compounds obtained by the process of this invention are saturated or unsaturated 3-oxygenated, especially 3,11-dioxygenated pregnene derivatives, of which the radical in 13-position is a free or functionally converted aldehyde group or a residue convertible thereinto. Oxygenated compounds and their functional derivatives are understood to be such as contain free or functionally converted hydroxyl or oxo groups, such as e.g. esters, ethers, thio esters, thio ethers, thiol esters, thione esters, acetals, mercaptals, ketals, enol derivatives, such as enol esters, enol ethers or enamines, hydrazones, semicarbazones and the like.

The products of the present process may be used as medicaments or as intermediate products for making medicaments.

The present invention also relates to any modification in which the steps are carried out in a different order of succession and/or in which only part of the steps are carried out in that one of the intermediate products obtainable at any stage is employed as starting material and the remaining stages of the process are carried out.

Starting materials for the process of this invention are acid derivatives, such as halides, esters, acid amides, nitriles of 3-oxygenated, especially 3,11-dioxygenated steroid-17-carboxylic acids, including compounds of the homo and nor series, especially 19-nor and/or D-homo-acetianic acids, the carboxyl group of the latter being in the 17$\alpha$-position, of course. The starting materials are of any steric configuration and contain at the carbon atom 3 and especially carbon atoms 3 and 11 free or functionally converted hydroxyl or oxo groups and in 13-position a free or functionally converted aldehyde group or a residue convertible thereinto, such as for example a free or functionally converted carboxyl or carbinol group. Thus the residue in 13-position may for example be a lactonized carboxyl group, e.g. lactonized with the 11$\beta$-hydroxyl. The starting materials are saturated and may contain a double bond extending, for example, from carbon atom 5, in other words, being in the 4,5 or 5,6-position.

The starting materials are new. They can be made for example by the process of our application Serial No. 480,062, filed concurrently herewith. Moreover, some of them are obtained when saturated or unsaturated 3,11-dioxygenated 17- or 20-keto-steroids or 3-oxygenated 13,17-seco-steroid-17,13-lactones are oxidatively converted into 3,11-dioxygenated 13,17-seco-steroid-17,13-lactones, the latter cleaved into 13-carbinols, water is eliminated directly or indirectly, if desired after the preparation of an 11-keto group, the side chain in $\alpha,\beta$-unsaturated ketones obtained is degraded, if desired, in known manner to 2 or 3 carbon atoms and/or converted into a substituent which reacts with an acetic acid derivative containing an active methylene group, the methyl group at the double bond is oxygenated and the compounds obtained are reacted to form 3,11,18-trioxygenated steroid-17-carboxylic acids or pregnane-20-ones or functional derivatives by way of substituted acetic acid derivatives having an active methine group.

These starting materials are oxidatively converted into the corresponding 3:11-dioxygenated-13:17-seco-steroid-17:13-lactones, for example, by means of hydroperoxides, such as hydrogen peroxide or peracids, for example, performic acid, peracetic acid or perbenzoic acid, or by a microbiological method, for example, by means of micro-organisms of the groups Mucorales, such as Cunninghamella, Actinomycetes, such as Streptomycetes, Curvularia, Penicillium, Cylindrocarpon, Gliocladium, Aspergillus types or *Fungi imperfecti*. The latter method is also especially suitable for the introduction of oxygen into the 11-position of lactones to be used in the process of the invention or for the degradation of 20-ketones to lactones. During these and the subsequent oxidations, especially when chemical oxidizing agents are used, reactive double bonds in unsaturated rings of the starting materials, for example, a double bond in the 5:6-position, are protected, if desired, intermediately, for example, by additive combination with halogen or a hydrogen halide or conversion into an i-steroid. Any free hydroxyl groups present are advantageously temporarily protected wholly or in part, for example, by esterification or etherification.

A further step in the process consists in splitting up the lactone so obtained into a 13-carbinol, especially by means of a hydrolyzing agent such as an alkali hydroxide, an alkaline earth metal hydroxide, aluminium oxide and the like, or with an organo-metal compound such as a Grignard compound, for example methyl-, or phenyl-magnesium halide, or an alkyl- or aryl-lithium compound. If the treatment is carried out with only about one equivalent of alkyl magnesium halide, it is at first possible only to cause the addition of an alkyl residue without splitting up the ring.

After a different substituent in the 11-position has been converted in known manner into a keto group, the elimination of the 13-hydroxyl group takes place very easily. Normally it takes place directly with elimination of water, generally with the reagents used for splitting up the lactone ring. In the case of the dihydropyrane derivatives or the corresponding 7-ring compounds which are at first obtained, if desired, with alkyl magnesium halides, water is in effect split off indirectly by the oxidation and splitting off of the acyloxy group in the 13-position. After the splitting up of the lactone ring by means of at least two equivalents of organo-metal compound, and simultaneously with the splitting off of water in the nucleus or independently thereof, water may be split off in the side chain, for example, by means of an excess of the organo-metal compound or by an agent customarily used for splitting off water.

A further step which may be carried out if desired, is the conversion of a 16-substituent into a hydroxyl, oxo or amino group, especially by means of a hydrolysing agent. The side chain in the $\alpha:\beta$-unsaturated ketone is then degraded in a manner in itself known to two carbon atoms, or if D-homo-compounds are desired to three carbon atoms, and/or converted into a substituent which reacts with an acetic acid derivative containing an active methylene group. For the degradation there is advantageously used an oxidising agent such as ozone, chromic acid or lead tetracetate, or the silver salt of the carboxylic acid may be degraded by means of halogen by the method of Hunsdiecker.

In order to oxygenate the methyl group at the double bond it may, for example, be hydroxylated or acyloxylated, directly, for example, by means of selenium dioxide, lead tetracetate, or indirectly, for example, by halogenation, ketone splitting and subsequent reaction, for example, by means of a salt of a carboxylic acid such as an alkali acylate or silver acylate. If it is desired, for example, to bring about oxygenation, this step may be carried out by oxidation of the hydroxylated compound or directly. Thus, for example, the starting compound may be reacted with selenium dioxide or the above mentioned halide may be converted by the method of Kröhnke by way of the quaternary ammonium salt and the nitrone. In this case also derivatives of the aldehyde group may be obtained intermediately, for example, acetals with monohydric or polyhydric alcohols, and also diacylates. The aforesaid total conversion of the methyl group at the double bond may also be carried out at a different stage in the synthesis and may be interrupted by other later process steps.

Likewise, at any intermediate stage in the synthesis, a $\Delta^4$-3-keto group may be introduced in known manner, especially by halogenation and the splitting off of hydrogen halide, for example, by means of a hydrazine such as semicarbazide or by means of pyruvic acid, and the oxidation of a 3-hydroxyl group and the halogenation may be carried out in a single reaction by means of an alkyl hypohalide. The $\Delta^4$-3-keto group so produced may, if desired, be subsequently protected intermediately, for example, by ketalisation or the formation of an enol derivative by a method in itself known.

An essential step of the process is the conversion to a steroid by way of a substituted acetic acid derivative containing an active methine group, such as an acetoacetic acid derivative or malonic acid derivative. This is carried out, for example, by subjecting a primary 16-halide or pseudohalide to a reaction of the character of an acetoacetic acid ester or malonic acid ester synthesis and to intramolecular condensation according to the method of Michaël, or by first carrying out a Michaël condensation and subjecting the resulting acetic acid derivative to ring closure. As is usual in acetoacetic acid ester and malonic acid ester syntheses the resulting derivative containing one or two substituted acid residues is subjected in known manner to a ketone or acid splitting.

In a stage following ring closure to form the steroid the 11-keto group can reductively be converted into an 11-hydroxyl group, advantageously an 11β-hydroxyl group, for example, by means of a light metal hydride such as an alkali metal boron hydride or alkali metal aluminium hydride.

One form of the process for the preparation of the starting materials is illustrated by the following diagram of formulae

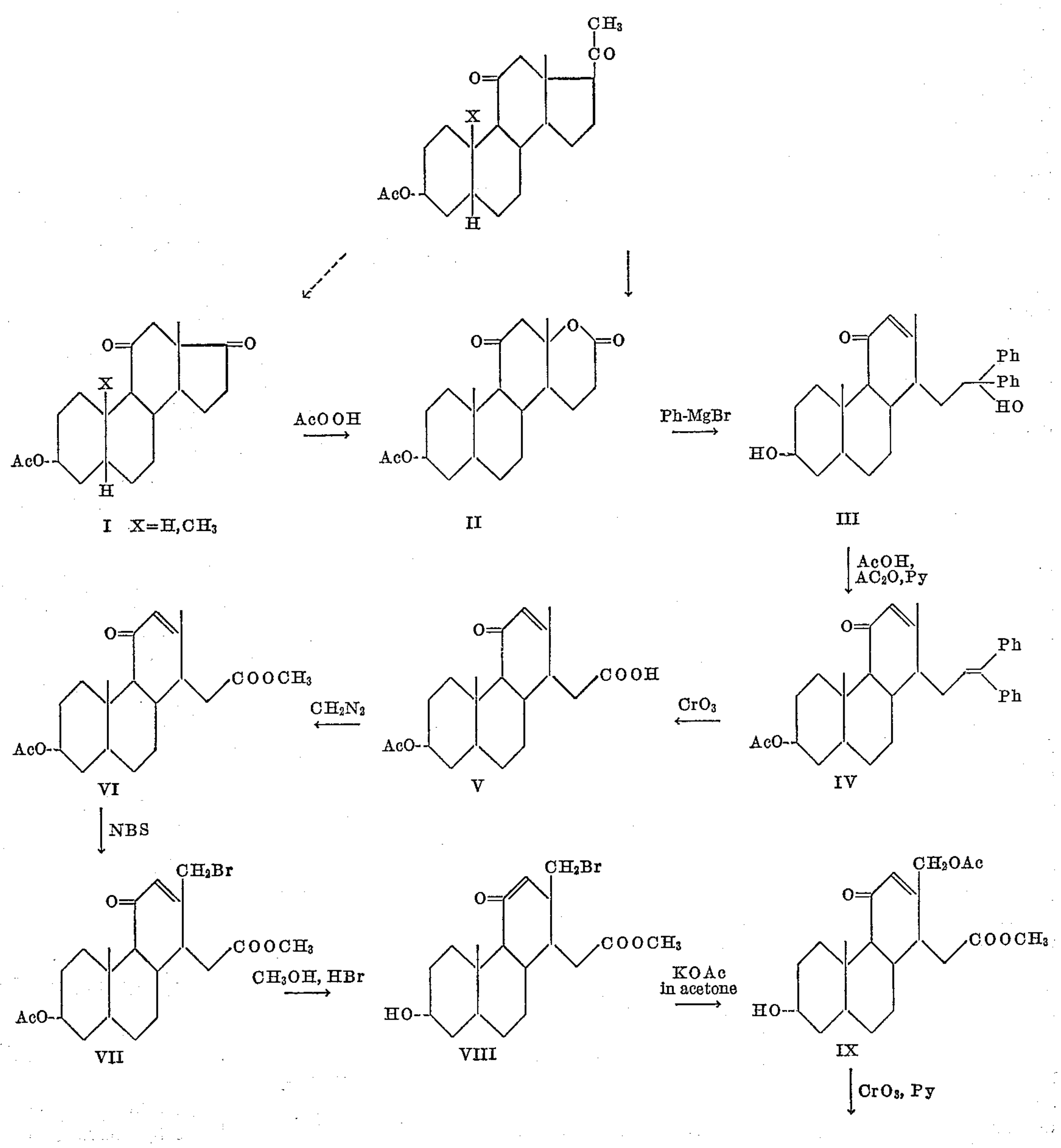

I X=H,CH3
II
III
IV
V
VI
VII
VIII
IX

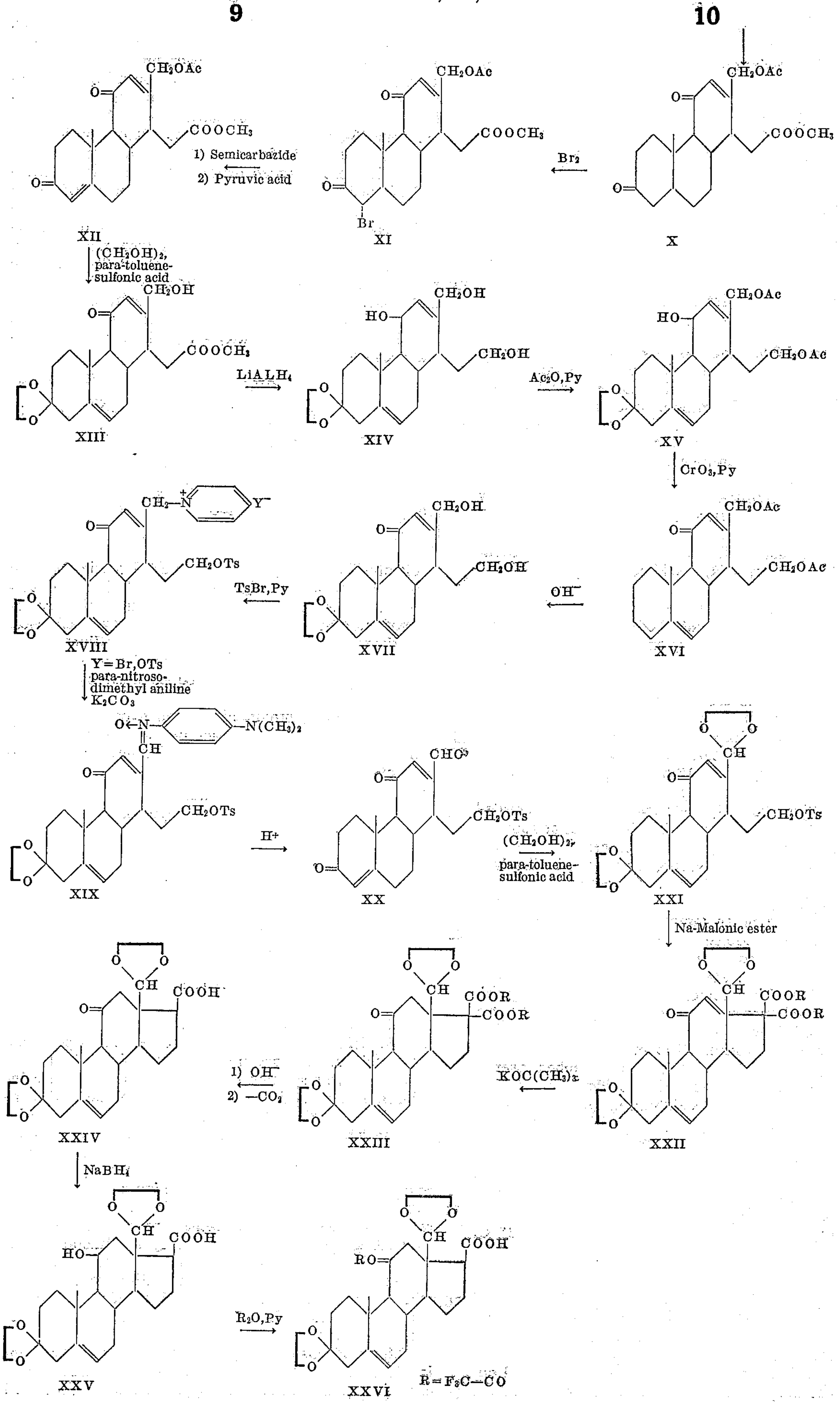
1) Semicarbazide
2) Pyruvic acid
Br2
XII
XI
X
(CH2OH)2, para-toluene-sulfonic acid
LiALH4
Ac2O,Py
XIII
XIV
XV
CrO3,Py
TsBr,Py
OH⁻
XVIII
XVII
XVI
Y=Br,OTs
para-nitroso-dimethyl aniline
K2CO3
H+
(CH2OH)2, para-toluene-sulfonic acid
XIX
XX
XXI
Na-Malonic ester
1) OH⁻
2) —CO2
KOC(CH3)3
XXIV
XXIII
XXII
NaBH4
R2O,Py
XXV
XXVI
R=F3C—CO The resulting compound XXV, on ketal and acetal splitting and subsequent oxidation yields the 18,11-lactone of $\Delta^4$-3-oxo-11β-hydroxy-etienic acid-18-acid obtained by degrading aldosterone

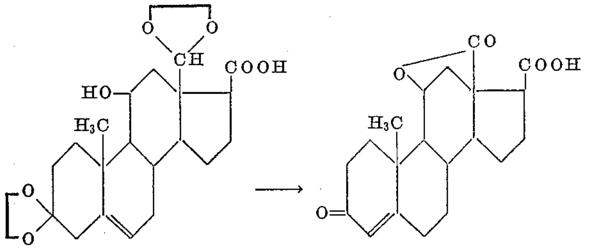

The following examples illustrate the invention:

*Example 1*

A solution of 0.531 gram of dry $\Delta^5$-3:18-bis-ethylene-dioxy-11β-trifluoracetoxy-aetienic acid in 15 cc. of absolute benzene and 0.8 cc. of absolute pyridine is mixed at 5° C. with 1.8 cc. of oxalyl chloride in 10 cc. of absolute benzene, and the whole is allowed to stand at 20° C. for 20 minutes. It is then evaporated in vacuo, the residue is taken up in 20 cc. of absolute benzene, and the mixture is filtered to remove the insoluble precipitate. The filtrate is introduced into 26.5 cc. of ice-cold dry 0.38-molar ethereal solution of diazo-methane, and then allowed to stand at room temperature for 2 hours, and evaporated in vacuo. There is obtained crude $\Delta^5$-3:18-bis - ethylene - dioxy - 11β - trifluoracetoxy - 20 - keto-21-diazo-pregnene.

The diazo-ketone so prepared is dissolved in 30 cc. of methanol, then mixed with 0.800 gram of potassium carbonate in 12 cc. of water, and allowed to stand in the molten state in vacuo for 22 hours at room temperature. It is then diluted with water, the methanol is removed in vacuo, and the suspension remaining behind is extracted by agitation with a mixture of ether and chloroform, (3:1). The solution is washed with water and dried with sodium sulfate, and then evaporated in vacuo to yield crude $\Delta^5$-3:18-bis-ethylene-dioxy-11β-hydroxy-20-keto-21-diazo-pregnene.

The resulting free 11β-hydroxy-compound is heated with 4 cc. of glacial acetic acid for 30 minutes at 100° C., after which the splitting off of nitrogen ceases. The mixture is then evaporated in vacuo, the residue is dissolved in 120 cc. of acetone, 0.076 gram of para-toluene sulfonic acid is added, and the mixture is stirred for 24 hours at room temperature in an atmosphere of nitrogen. The reaction mixture is cooled in ice water and mixed with 4.0 cc. of an 0.1 N-solution of sodium carbonate and 30 cc. of water, and the acetone is distilled off in vacuo. The suspension which remains behind is extracted by agitation with a mixture of ether and chloroform (3:1), the extract is washed with water, dried with sodium sulfate and evaporated in vacuo. The residue is dissolved in benzene, and the solution is chromatographed over a column of 15 grams of aluminium oxide prepared with benzene. There are used as elutriating agents benzene, a mixture of benzene and ether (3:1), ether, a mixture of ether and ethyl acetate (9:1) and ethyl acetate. The last fractions obtained with ether and also the fractions obtained with ether-ethyl acetate and ethyl acetate yield, after crystallisation from a mixture of acetone and ether, pure $\Delta^4$ - 3:18:20 - trioxo - 11β - hydroxy - 21 - acetoxy-pregnene or its 11:8-semi-acetal melting at 190–192° C.

*Example 2*

1.12 mg. of the 18:11-lactone of $\Delta^4$-3.20-dioxo-11β:21-dihydroxy-pregnene-18-acid are dissolved in 5 cc. of ethylene dichloride. After the addition of a small crystal of p-toluene sulfonic acid and a drop of pure ethylene glycol, ethylene dichloride is slowly distilled off. By dropwise addition of new solvent, the volume of the reaction solution is maintained constant. After 4 hours, the content of the flask is washed twice with 1 cc. of a 1% sodium carbonate solution each time and twice with 1 cc. of water each time and the solution dried and evaporated under vacuum. The residue constitutes the 18:11-lactone of the $\Delta^5$-3:20-diethylene-dioxy-11β:21-dihydroxy-pregnene-18-acid, which is dissolved without purification in 5 cc. of tetrahydrofurane. After cooling to −10° to −15° C. there is added dropwise with stirring a tetrahydrofurane solution of lithium-aluminium hydride such as is calculated for the reduction of the lactone to the semiacetal group while taking into account the 21-hydroxyl group. The cooling bath is then removed and the temperature allowed to rise to about 20° C. The tetrahydrofurane solution is diluted with 50 cc. ether and washed consecutively with 0.1-N sulfuric acid and water, dried and evaporated under vacuum. The crude $\Delta^5$ - 3:20 - diethylene - dioxy - 11β:21 - dihydroxy - 18-oxo-pregnene of the formula:

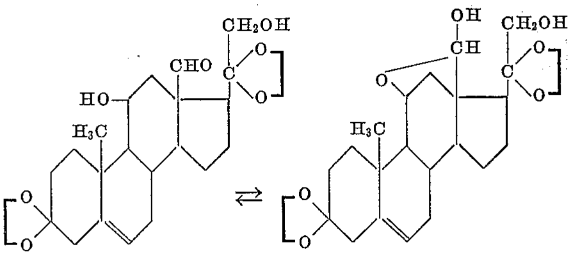

is dissolved without purification in 50% acetic acid and allowed to stand over night at about 20° C. The reaction mixture is extracted twice, each time with 5 cc. of chloroform-ether (1:3) and the extracts are washed twice, each time with 1 cc. of water, dried over sodium sulfate and evaporated under vacuum. From the crude product which results, aldosterone can be obtained by chromatography.

If an excess of lithium-aluminium hydride is used in the above reduction, then after the ketal splitting there is obtained the $\Delta^4$-3:20-dioxo-11β:18:21-trihydroxy-pregnene of the formula:

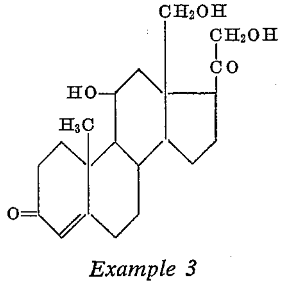

*Example 3*

20.1 mg. of 18:11-cyclosemiacetal-18-monoacetate of $\Delta^4$ - 3:18:20 - trioxo - 11β:21 - dihydroxy - pregnene are dissolved, in a dry nitrogen atmosphere, in 1.5 cc. of a 0.05-molar solution of pyridine in anhydrous chloroform, 14.5 mg. of purest p-toluene sulfonic acid chloride added and after placing under vacuum and well mixing, the whole allowed to stand for 48 hours at room temperature. The reaction mixture is then diluted with chloroform and ether, washed with 0.5-N-hydrochloric acid, 0.1-N-sodium bicarbonate solution and water, dried with sodium sulfate and the solution evaporated. The residue is dissolved in benzene and chromatographed over 1.0 gm. of aluminium oxide by the fractional elution method. The fractions removed with pure ether and ether-ethyl acetate (3:1) crystallize from acetone-ether. They constitute mixtures of 21-chloride and 21-tosylate and are subjected together to the subsequent reaction with sodium iodide.

12.8 mg. of this resulting mixture and 75 mg. of sodium iodide are boiled in 1.0 cc. of acetone for 6 minutes with exclusion of moisture. Thereupon the whole is cooled in ice water and evaporated under vacuum. The residue is immediately taken up in 0.3 cc. of glacial acetic acid, the suspension decolorized by rinsing round with a trace of zinc dust and then again evaporated under vacuum. Water is then added and extraction carried out by shaking with chloroform-ether (1:3). The combined extracts are washed with 0.3 N-hydrochloric acid, 0.1 N-sodium bicarbonate solution and water, dried with sodium sulfate and evaporated. The remaining pale yellow lacquer is dissolved in benzene and chromatographed over 0.5 gm. of aluminium oxide. The fractions removed with benzene-ether (1:1), pure ether and ether-ethyl acetate (9:1), give from acetone-ether pure 18:11-cyclosemiacetal-18-monoacetate of $\Delta^4$-3:18:20-trioxo-11$\beta$-hydroxy-pregnene.

*Example 4*

To a mixture of 8.25 g. of the d:l-$\Delta^5$-3-ethylene-dioxy-11$\beta$:18-dihydroxy-20-oxo-pregnene described in our application Serial No. 480,062, filed concurrently herewith, 4.7 g. of freshly prepared dry sodium methylate and 9.4 g. of oxalic acid dimethyl ester are added 65 cc. of dry benzene. The whole is then stirred for 24 hours in a current of nitrogen at room temperature. After adding ice and cautiously acidifying, the mixture is immediately extracted by agitation with ether. The ethereal solution is extracted with 173 cc. of a 1 N-solution of caustic potash, and the aqueous alkaline solution is allowed to stand at room temperature for 1 hour. It is then cautiously acidified while cooling with ice and again immediately extracted by agitation with ether. From the residue obtained by drying and evaporating in vacuo the ethereal solution there is obtained by crystallisation d:1-$\Delta^5$-3-ethylenedioxy-11$\beta$:18-dihydroxy-aetienoyl-pyruvic acid in the form of colorless crystals.

2.31 g. of the acid so obtained are mixed with 600 cc. of water which contains 25 g. of disodium hydrogen phosphate, and then a suspension of 1.27 g. of iodine in 120 cc. of ether is slowly added while stirring. When the color of the iodine has disappeared, a solution of 1.2 g. of potassium hydroxide in 36 cc. of water is added, and the whole is stirred in the dark for 24 hours in an atmosphere of nitrogen. To the residue obtained by separating, drying and evaporating in vacuo the ethereal solution are added 8 g. of dry potasisum acetate and 100 cc. of acetone. After boiling the mixture for one hour under reflux, the acetone is evaporated in vacuo and the residue is extracted several times with ether. From the ethereal solutions there is obtained by washing with water, drying and evaporating those solutions, crude d:l-$\Delta^5$-3-ethylene-dioxy - 11$\beta$:18 - dihydroxy - 20 - oxo - 21 - acetoxy - pregnene, which is obtained in a pure form by chromatography over aluminium oxide.

0.25 g. of the ketal is stirred overnight with a solution of 0.05 g. of para-toluene sulfonic acid in 20 cc. of acetone. After dilution with a saturated solution of sodium chloride and extraction by agitation with chloroform, there is obtained from the washed, dried and evaporated chloroform solutions d:l-18-hydroxy-corticosterone acetate.

Hydrolysis of the resulting acetate is carried out as follows:

A solution of 0.3 g. of potassium bicarbonate in 10 cc. of water is added to 0.25 g. of d:l-18-hydroxy-corticosterone acetate and 40 parts by volume of methanol in a current of nitrogen, while stirring. After allowing the whole to stand for 48 hours at 20° C. in an evacuated vessel, the mixture is evaporated in vacuo to one fifth of its original volume and extracted by agitation with a mixture of chloroform and ether (1:3). The residue obtained by washing with water, drying and evaporating in vacuo the organic solution is chromatographed over 10 parts of aluminium oxide (activity II, neutral), whereby d:l-18-hydroxy-corticosterone is obtained.

*Example 5*

0.29 g. of N-bromacetamide is added to 0.9 g. of the d:l - $\Delta^5$ - 3 - ethylenedioxy - 11$\beta$ - 18 - dihydroxy - 20-oxo-21-acetoxy-pregnene obtained as described in Example 4 and 20 g. of pyridine, while stirring. After 4 hours the whole is poured on to ice and 130 cc. of 2 N-hydrochloric acid, and immediately extracted several times with chloroform. In order to separate unreacted starting material, the residue obtained by drying and evaporating in vacuo the chloroform solution is chromatographed over aluminium oxide. In this manner there is obtained d:l - $\Delta^5$ - 3 - ethylene - dioxy - 11$\beta$ - hydroxy - 18:20 - dioxo-21-acetoxy-pregnene.

By using in this example, instead of the ketal, 0.81 g. of d:l-18-hydroxy-corticosterone acetate, there is obtained d:l-18-oxo-corticosterone acetate which exhibits in the infra-red region characteristic bands at 2.78$\mu$ (free hydroxyl group) and at 5.72$\mu$, 5.82$\mu$, 5.97$\mu$ and 6.16$\mu$ (double bond region).

0.5 g. of d:l-18-oxo-corticosterone acetate is mixed with 80 cc. of methanol, and then a solution of 0.6 g. of potassium bicarbonate in 21 cc. of water is added in an atmosphere of nitrogen, while stirring. The reaction solution is allowed to stand for 48 hours at 20° C. while evacuated and enclosed. Traces of a precipitate are then filtered off, and the solution is extensively evaporated in vacuo. After extracting the aqueous residue by agitation with a mixture of chloroform and ether (1:3), the organic solution is washed with water, dried and evaporated. The resulting d:l-18-oxo-corticosterone is recrystallised from a mixture of acetone and ether for the purpose of further purification.

The starting materials can be prepared, for example, as follows:

*Example 6*

A solution of 0.693 gram of 3$\alpha$-acetoxy-11:17-diketo-testane (I) and 0.035 gram of paratoluene sulfonic acid in 14 cc. of glacial acetic acid resisting to chromic acid is mixed with 2.27 cc. of a 1.06-molar solution of acetoperacid in glacial acetic acid, and the mixture is maintained in the dark for 72 hours at room temperature. A large quantity of water is then added, the partially precipitated reaction product is taken up in methylene chloride, the extract is washed with an 0.5 N-solution of sodium hydrogen carbonate and water, dried with sodium sulfate and evaporated. The pale yellow residue is dissolved in benzene, and the solution is chromatographed by the fractional elution method over a column of 21 grams of silica gel prepared with benzene. As elutriating agents there are used in succession benzene, ether and ethyl acetate. At first a small amount of an amorphous substance is dissolved out with benzene. From the succeeding ether and ethyl acetate elutriates there is obtained by crystallisation from a mixture of benzene and hexane pure 3$\alpha$-acetoxy-13$\alpha$-hydroxy-13:17-secotestane-17-acid-17:13-lactone of the Formula II melting at 178–180° C.

The same compound can also be obtained by treating 3$\alpha$-acetoxy- or 3$\alpha$-hydroxy-11:20-diketo-pregnane with an aerated and stirred submerged culture of *Aspergillus flavus, Penicillium adametzi, Penicillium lilacinum* or *Pencillium chrysogenum, Streptomyces lavendulae, Fusarium solani* or *caucasicum,* and acylating the reaction product with acetic anhydride in pyridine.

*Example 7*

0.732 gram of 3$\alpha$ - acetoxy - 13$\alpha$-hydroxy-13:17-secotestane-17-acid-17:13-lactone, dissolved in 7.5 cc. of benzene, is run in the course of 30 minutes into a boiling solution of phenyl-magnesium bromide prepared from 3.21 grams of magnesium and 12.6 cc. of bromobenzene in 100 cc. of ether. The whole is boiled for 22 hours, then 7.5 cc. of a 4-molar aqueous solution of ammonium chloride is added while cooling with ice, the benzene and the resulting diphenyl are distilled with steam. After cooling the mixture, the precipitated crude product is taken up in ether, the ethereal extract is washed with a 2-molar solution of ammonium chloride and water, dried with sodium sulfate and evaporated.

In order to split off water the crude carbinol so obtained is covered with 12 cc. of glacial acetic acid and the mixture is boiled for 16 hours with the exclusion of moisture. After cooling the mixture, water is cautiously added and the precipitated reaction product is filtered off with suction after allowing the mixture to stand for several hours. It is thoroughly washed with water and dried. By recrystallizing it from methanol and a mixture of ethyl acetate and isopropyl ether there is obtained pure $\Delta^2$-1β-(3′:3′-diphenyl-allyl)-7α-acetoxy-4-keto-2:4bβ-dimethyl-4aα:8aβ:10aβ-dodecahydro-phenanthrene of the Formula IV. In the ultra-violet spectrum the compound exhibits a λ maximum=244 mμ; log ε=4.52.

*Example 8*

To a solution of 0.965 gram of $\Delta^2$-1β-(3′:3′-diphenyl-allyl)-7α-acetoxy-4-keto-2:4bβ-dimethyl-4aα:8aβ:10aβ-dodecahydrophenanthrene in 11.2 cc. of ethylene chloride and 24.0 cc. of acetic acid of 83.3 percent strength there is added at 0–3° C. while stirring in the course of 4 hours a solution of 0.480 gram of chromium trioxide in 4.32 cc. of acetic acid of 83.3 percent strength. After the mixture has been stirred for 18 hours while cooling with ice, there are added 7.5 cc. of an 0.1-molar solution of sodium hydrogen sulfite, and the organic solvent is distilled off in vacuo while replacing the evaporated water. The residue is extracted by agitation with a mixture of ether and methylene chloride (3:1), the extract is first washed with water, 0.5 N-sulfuric acid and water, and then the acid reaction products are exhaustively extracted with a 2 N-solution of sodium carbonate. The combined alkaline extracts are acidified with 2 N-hydrochloric acid and extracted by agitation with a mixture of ether and methylene chloride (3:1). The ether-methylene chloride extract is washed with water and dried with sodium sulfate, and then mixed with an 0.41-molar solution of diazo methane in ether until the yellow coloration persists, and the extract is evaporated after 20 minutes.

The crude ester so obtained is dissolved in 3.0 cc. of anhydrous pyridine and mixed with 2.0 cc. of acetic anhydride. After 16 hours the mixture is evaporated in vacuo with the repeated addition of toluene, and the residue is recrystallised from a small quantity of methanol. There is obtained in the form of colorless crystals $\Delta^2$-7α-acetoxy-4-keto-2:4bβ-dimethyl-4aα:8aβ:10aβ-dodecahydro-phenanthryl-(1β)acetic acid methyl ester of the Formula VI, which exhibits in the ultraviolet absorption spectrum a λ max=240 mμ, log ε=4.20. The acid V can also be obtained directly from the 3α-acetoxy-13α-hydroxy-13,17-seco-testane-17-acid-17,13-lactone of the Formula II described in Example 6: 20 mg. of lactone II are dissolved in benzene and allowed to stand for 4 hours in a column of 1 gram of (neutral) alumina. It is then washed with benzene, ether and chloroform, practically no material being separated. Washing with a mixture of methanol and glacial acetic acid then elutriates the $\Delta^2$-7α-acetoxy-4-keto-2,4bβ-dimethyl-4aα:8aβ:10aβ-dodecahydro-phenanthryl-(1β)-acetic acid of the Formula V.

*Example 9*

1.450 gram of $\Delta^2$-7α-acetoxy-4-keto-2:4bβ-dimethyl-4aα:8aβ:10aβ-dodecahydrophenanthryl-(1β)-acetic acid methyl ester and 0.890 gram of N-bromo-succinimide are covered with 30 cc. of carbon tetrachloride, and the mixture is boiled for 20 minutes under reflux while being strongly illuminated. After cooling the mixture in ice water the succinimide is filtered off with suction and the pale yellow filtrate is evaporated in vacuo. The residue yields by recrystallisation from a mixture of ether and isopropyl ether $\Delta^2$17α-acetoxy-4-keto-2-(bromomethyl)-4bβ-methyl-4aα:8aβ:10aβ-dodecahydro-phenanthryl-(1β)-acetic acid methyl ester of the Formula VII.

A solution of 0.883 gram of the crystalline bromide in 40 cc. of methanol is mixed with 7.6 cc. of a 2.63 N-methanolic solution of hydrobromic acid, and the whole is allowed to stand for 22 hours. After dilution with a large quantity of water the mixture is extracted by agitation with a mixture of ether and methylene chloride (3:1), the extract is washed with water, 0.5 N-solution of sodium acetate and water, then dried with sodium sulfate and evaporated. The residue is crude $\Delta^2$-7α-oxy-4-keto-2-(bromomethyl)-4bβ-methyl-4aα:8aβ:10aβ-dodecahydro-phenanthryl-(1β)-acetic acid methyl ester of the Formula VIII. It is advantageously further worked up directly.

The free 7α-hydroxy-compound so obtained is dissolved in 10 cc. of anhydrous acetone, 0.982 gram of anhydrous potassium acetate is added, and the mixture is boiled for 6 hours with the exclusion of moisture. After cooling the mixture, 20 cc. of water are added and the acetone is distilled off in vacuo. The precipitated resin is taken up in ether, and the extract is washed with water, an ice cold 0.1 N-solution of sodium hydrogen carbonate and water, dried with sodium sulfate and evaporated. For the purpose of purification the residue is dissolved in a mixture of hexane and benzene (9:1) and chromatographed by the fractional elution method over a column of 25 grams of aluminum oxide prepared with hexane. As elutriating agents there are used a mixture of hexane and benzene (9:1) and (1:1), benzene, a mixture of benzene and ether (9:1) and ether. The last portions eluted with benzene and also the fractions subsequently obtained with benzene-ether (9:1) and ether crystallise from a mixture of ether and petroleum ether. By recrystallisation from the same pair of solvents there is obtained pure $\Delta^2$-7α-hydroxy-4-keto-2-(acetoxy-methyl)-4bβ-methyl-4aα:8aβ:10aβ-dodecahydro-phenanthryl-(1β)-acetic acid methyl ester of the Formula IX.

*Example 10*

1.514 gram of $\Delta^2$-7α-hydroxy-4-keto-2-(acetoxy-methyl)-4bβ-methyl-4aα:8aβ:10aβ-dodecahydro-phenanthryl-(1β)-acetic acid methyl ester are added while rinsing with 2.2 cc. of pyridine to a suspension of the chromic acid-pyridine complex prepared by introducing 0.440 gram of chromium trioxide into 8.8 cc. of pyridine. The mixture is stirred for 18 hours at room temperature. A large quantity of water is then added, the mixture is extracted with ether by agitation, the extract is washed in succession with water, ice cold 0.5 N-sulfuric acid and water, and then dried with sodium sulfate and evaporated. The residue is crystallised from a mixture of ether and isopropylether. The resulting $\Delta^2$-4:7-diketo-2-(acetoxy-methyl)4bβ-methyl-4aα:8aα:10aβ-dodecahydro-phenanthryl-(1β)-acetic acid methyl ester of the Formula X exhibits, in contradistinction to the starting material, no hydroxyl band at 2.7μ in the infra-red absorption spectrum.

0.753 gram of the above diketone is dissolved in 15 cc. of glacial acetic acid, 0.30 cc. of a 1-molar solution of hydrogen bromide in glacial acetic acid is added, and 4.2 cc. of a solution of bromine and sodium acetate in glacial acetic acid, which is 0.5-molar with respect to both reagents, is slowly added dropwise while stirring. When the bromine is practically completed consumed, 80 cc. of water are added and the mixture is extracted by agitation with benzene. The extract is washed in succession with water, 0.5 N-sodium hydrogen carbonate and water, dried with sodium sulfate and evaporated in vacuo. The residue which slowly crystallizes on standing is crude $\Delta^2$-4:7-diketo-2-(acetoxy-methyl)-8-bromo-4bβ-methyl-4aα:8aβ:10aβ-dodecahydro-phenanthryl- (1β)-acetic acid methyl ester of the Formula XI, and is purified by recrystallisation from methanol and a mixture of ether and isopropyl ether.

To 0.455 gram of the above bromide in 75 cc. of ethanol of 95 percent strength is added, while stirring, 0.300 gram of semicarbazide and 0.75 cc. of glacial acetic acid. After 16 hours 75 cc. of water are cautiously added, the precipitated semicarbazone is collected on a suction filter after allowing the mixture to stand for one hour, and the filter residue is washed with water and dried in vacuo. For the purpose of splitting it is covered with 15 cc. of glacial acetic acid and 5.0 cc. of an aqueous 0.4 N-solution of pyroracemic acid and stirred for 38 hours in an atmosphere of carbon dioxide. After the addition of 20 cc. of water the mixture is extracted by agitation with a mixture of ether and methylene chloride (3:1) the extract is washed in succession with 2 N-solution of sodium hydrogen carbonate, water, 1 N-hydrochloric acid and water, and then dried with sodium sulfate and evaporated. The residue is dissolved in a mixture of hexane and benzene and chromatographed over a column of 20 grams of aluminum oxide prepared with hexane. Elutriation is carried out in succession with a mixture of hexane and benzene (9:1) and (1:1), benzene, a mixture of benzene and ether (9:1) and ether, and the fractions dissolved are tested by paper chromatography. The practically unitary benzene elutriates and benzene-ether elutriates crystallize from methanol. In this manner there are obtained practically colorless crystals of $\Delta^{2:8}$-4:7-diketo-2-(acetoxy-methyl)-4bβ-methyl - 4aα:10aβ - decahydro - phenanthryl - (1β) - acetic acid methyl ester of the Formula XII which exhibits in the ultraviolet absorption spectrum a $\lambda$ max=246 mμ; log ε=4.53.

*Example 11*

A mixture of 1.498 gram of $\Delta^{2:8}$-4:7-diketo-2-(acetoxy-methyl) - 4bβ - methyl - 4aα:10aβ - decahydro - phenanthryl-(1β)-acetic acid methyl ester, 2.25 cc. of ethylene glycol, 30 cc. of ethylene chloride and 0.016 gram of para-toluene sulfonic acid is subjected to slow distillation for 3 hours during which the moist ethylene chloride which distills off is replaced continuously by introducing fresh solvent. After being cooled, the reaction mixture is extracted in succession with a 1 N-solution of potassium carbonate and water, dried with sodium sulfate and evaporated. The resulting $\Delta^{2:8a}$-4-keto-2-(hydroxy-methyl) - 7 - ethylene - dioxy - 4bβ - methyl - 4aα:10aβ-decahydro-phenanthryl-(1β)-acetic acid methyl ester of the Formula XIII is purified by recrystallisation from a mixture of ether and petroleum ether.

0.753 gram of the above ketal is dissolved in 20 cc. of anhydrous tetrahydrofurane, a solution of 0.950 gram of lithium aluminium hydride in 13.5 cc. of anhydrous tetrahydrofurane is added dropwise, while stirring, and stirring is continued for 36 hours at room temperature. 2.7 cc. of water are then added dropwise while cooling externally with ice water, the mixture is freed from precipitated inorganic material, the filter residue being washed with tetrahydrofurane, and the filtrate is evaporated in vacuo. The residue is crude $\Delta^{2:8a}$-4β-hydroxy-1β - (2′ - hydroxy - ethyl) - 2 - (hydroxymethyl) - 7-ethylene - dioxy - 4bβ - methyl - 4aα:10aβ - decahydro-phenanthrene of the Formula XIV.

The crude triol so obtained is allowed to stand with 3.0 cc. of acetic anhydride in 4.5 cc. of pyridine for 16 hours at room temperature. The reaction mixture is then evaporated in vacuo with the repeated addition of toluene, the residue is dissolved in benzene, and the solution is filtered through a short column of active carbon. On evaporation the clear filtrate leaves behind a pale yellow residue. By recrystallisation from methanol there is obtained $\Delta^{2:8a}$ - 4β - hydroxy - 1β - (2′ - acetoxy - ethyl) - 2-(acetoxy - methyl) - 7 - ethylene - dioxy - 4bβ - methyl-4aα:10aβ-decahydro-phenanthrene of the Formula XV.

*Example 12*

A solution of 1.738 grams of $\Delta^{2:8a}$-4β-hydroxy-1β-(2′ - acetoxy - ethyl) - 2 - (acetoxy - methyl) - 7-ethylene - dioxy - 4bβ - methyl - 4aα:10aβ - decahydro-phenanthrene in 13.2 cc. of pyridine is added to 0.440 gram of chromium trioxide in 8.8 cc. of pyridine, and the mixture is stirred for 62 hours at room temperature. The whole is then diluted with a large amount of water, extracted by agitation with a mixture of benzene and ether (1:2), the extract is filtered through Super Cel, then washed with water, dried with sodium sulfate, and evaporated in vacuo. The residue is dissolved in a mixture of hexane and benzene (3:1), and chromatographed by the fractional elution method over a column of 52 grams of aluminium oxide prepared with hexane. Elutriation is carried out in succession with a mixture of hexane and benzene (3:1), benzene, a mixture of benzene and ether (9:1) and (1:1), ether and a mixture of ether and ethyl acetate (9:1). The fractions are tested by paper chromatography. The practically unitary elutriates which exhibit a strong absorption in the ultra-violet contain $\Delta^{2:8a}$ - 4 - keto - 1β - (2′ - acetoxy - ethyl) - 2-(acetoxy - methyl) - 7 - ethylene - dioxy - 4bβ - methyl-4aα:10aβ-decahydro-phenanthrene of the Formula XVI.

To 0.865 gram of the above ketone in 20 cc. of benzene are added 20 cc. of a 1 N-methanolic solution of potassium hydroxide, and the whole is heated at the boil for 2 hours. After cooling the mixture, 10 cc. of water are added, carbon dioxide is first introduced in order to neutralise the potassium hydroxide, and then the methanol is distilled off until the final volume of the mixture is small. After the addition of water, the crude product is taken up in a mixture of ether and ethyl acetate (1:1), and the extract is washed with water, dried with sodium sulfate and evaporated in vacuo. The residue consists substantially of $\Delta^{2:8a}$-4-keto-1β-(2′-hydroxy-ethyl) - 2 - (hydroxy - methyl) - 7 - ethylene - dioxy-4bβ-methyl-4aα:10aβ-decahydro-phenanthrene of the Formula XVII, and is then further worked up immediately.

The crude diol so obtained is dissolved in 4 cc. of pyridine, 1.41 grams of para-tosylbromide are added while stirring, the mixture is initially cooled for one hour to about 10° C., and then allowed to stand for 72 hours at room temperature while stirring occasionally. At the end of this period the greater part of the pyridine is evaporated cautiously in vacuo, the crystals are stirred with a mixture of methanol and ether (1:1) and the mixture is filtered with suction. The resulting N-{[$\Delta^{2:8a}$-4 - keto - 1β - (2′ - tosyloxy - ethyl) - 7 - ethylene - dioxy-4bβ - methyl - 4aα:10aβ - decahydrophenanthryl - (2)]-methyl}pyridinium salt of the Formula XVIII is purified by recrystallisation from a mixture of methanol and acetone.

*Example 13*

10 cc. of an 0.2 N-solution of sodium hydroxide are added to a solution of 1.289 grams of N-{[$\Delta^{2:8a}$-4-keto-1β - (2′ - tosyloxy - ethyl) - 7 - ethylene - dioxy - 4bβ-methyl - 4aα:10aβ - decahydro - phenanthryl - (2)]-methyl}-pyridinium bromide and 0.330 gram of para-nitro-dimethylaniline in 30 cc. of methanol and 20 cc. of water. After allowing the mixture to stand for 48 hours, it is filtered with suction, the filter residue is washed with methanol of 50 percent strength and water, and the resulting [$\Delta^{2:8a}$-4-keto-1β-(2′-tosyloxy-ethyl)-7-ethylene - dioxy - 4bβ - methyl - 4aα:10aβ - decahydro-phenanthryl - (2)] - N - (para - dimethylamino-phenyl)-nitrone of the Formula XIX is crystallized from methanol with the use of methylene chloride as solution promoter.

0.635 gram of the nitrone is agitated with 15 cc. of 1 N-hydrochloric acid and 60 cc. of a mixture of ether and benzene (3:1) for one hour in an atmosphere of hydrogen. The organic phase is then washed with water, 0.5 N-sodium hydrogen carbonate solution and water, dried with sodium sulfate and evaporated in vacuo. The residue consists of crude $\Delta^{2:8}$-4:7-diketo-1$\beta$-(2'-tosyloxy-ethyl) - 2 formyl - 4b$\beta$ - methyl - 4a$\alpha$:10a$\beta$ - decahydro-phenanthrene of the Formula XX.

The resulting crude aldehyde is dissolved in 25 cc. of ethylene chloride, 2.5 cc. of ethylene glycol and 0.019 gram of para-toluene sulfonic acid are added, and the mixture is subjected to slow distillation for 3 hours. The moist ethylene chloride which passes over is continuously replaced by fresh ethylene chloride. After being cooled, the solution is agitated with an 0.5 N-solution of potassium carbonate and water, dried with sodium sulfate and evaporated. The residue is dissolved in a mixture of hexane and benzene (1:1), and for the purpose of purification the solution is chromatographed by the fractional elution method over a column of 32 grams of aluminium oxide prepared with hexane. Elutriation is carried out in succession with a mixture of hexane and benzene (1:1) and (1:3), benzene, and a mixture of benzene and ether (9:1). The benzene fractions and benzene-ether fractions, which are practically unitary according to tests by paper chromatography, are crystallized from ether, and there is obtained $\Delta^{2:8a}$-4-keto-1$\beta$-(2' - tosyloxy - ethyl) - 2 - (ethylene - dioxy - methyl)-7 - ethylene - dioxy - 4b$\beta$ - methyl - 4a$\alpha$:10a$\beta$ - deca-hydro-phenanthrene of the Formula XXI.

*Example 14*

2.720 grams of $\Delta^{2:8a}$-4-keto-1$\beta$-(2'-tosyloxy-ethyl)-2-(ethylene-dioxy-methyl)-7-ethylene-dioxy - 4b$\beta$ - methyl-4a$\alpha$:10a$\beta$-decahydro-phenanthrene and 5 cc. of absolute ethanol are added to a solution of sodium malonic ester, prepared from 0.130 gram of sodium, 25 cc. of absolute ethanol and 0.880 gram of malonic acid diethyl ester, and the mixture is heated at the boil for 8 hours in an atmosphere of nitrogen. Water is added to the cooled mixture, the greater part of the ethanol is distilled off in vacuo, and the crude alkylation product is taken up in a mixture of ether and benzene (1:1). The solution is washed with water, dried with sodium sulfate and evaporated.

To a solution of the residue in 100 cc. of tertiary butanol there are added 5 cc. of an 0.1-molar solution of potassium tertiary butylate in tertiary butanol, and the whole is heated on a water bath for 2 hours in an atmosphere of nitrogen. The solvent is then distilled off in vacuo while introducing water, the precipitated condensation product is taken up in benzene, the solution is washed with water, dried with sodium sulfate and evaporated. The residue is dissolved in benzene and the solution is chromatographed by the fractional elution method over a column of 75 grams of aluminium oxide prepared with benzene. Elutriation is carried out with benzene, a mixture of benzene and ether (9:1), ether, and a mixture of ether and ethyl acetate (9:1). The fractions dissolved out with benzene-ether (9:1) and ether, which are unitary according to tests by paper chromatography and exhibit no absorption in the ultra-violet yield when recrystallized from a mixture of ethyl acetate and ether $\Delta^5$-3:18-bis-ethylene-dioxy-11-keto-androstene-17:17-dicarboxylic acid diethyl ester of the Formula XXIII.

1.065 grams of the dicarboxylic acid ester are saponified by being boiled for 2 hours in an atmosphere of nitrogen with 50 cc. of a 4 N-methanolic solution of potassium hydroxide. After the addition of water, neutral substances which are still present are removed from the mixture by agitating it with a mixture of ether and benzene (1:1), and then 0.1 N-sulfuric acid is added, while cooling with ice and stirring, until the reaction is neutral to litmus. The precipitated free dicarboxylic acid is then taken up in a mixture of ethyl acetate and benzene (3:1), the solution is washed with 0.01 N-ammonium carbonate solution and water, dried with sodium sulfate and evaporated. The residue is heated with 25 cc. of ethylene glycol at 120–125° C. until carbon dioxide ceases to be split off, the solution is then cooled and water is added cautiously. The precipitated $\Delta^5$-3:18-bis-ethylene-dioxy-11-keto-aetienic acid of the Formula XXIV is filtered off after allowing the mixture to stand for several hours, and the filter residue is washed with water and dried in vacuo.

*Example 15*

A mixture of 0.865 gram of $\Delta^5$-3:18-bis-ethylene-dioxy-11-keto-aetienic acid, 0.756 gram of sodium boron hydride and 40 cc. of absolute methanol is boiled under reflux for 2 hours. After cooling the mixture in ice water it is neutralised, while stirring, by first adding about 10 cc. of 2 N-acetic acid and then water until the separation of the reduction product is complete. By filtering, washing the filter residue with water and drying there is obtained $\Delta^5$-3:18-bis-ethylene-dioxy-11$\beta$-hydroxy-aetienic acid of the Formula XXV.

2 cc. of trifluoracetic anhydride are added at 0° C. to a solution of 0.435 gram of the hydroxy-acid in 5 cc. of pyridine, and the mixture is allowed to stand at room temperature for 4 hours. It is then mixed with 5 cc. of dioxane and 2 cc. of water, and the whole is allowed to stand for a further 2 hours. It is then extracted by agitation with a mixture of ether and chloroform (3:1), the extract solution is washed with water, dried with sodium sulfate and evaporated in vacuo with the repeated addition of benzene. The residue is crude $\Delta^5$-3:18-bis-ethylene-dioxy-11$\beta$-trifluoracetoxy-aetienic acid of the Formula XXVI.

*Example 16*

4.597 mg. of aldosterone hydrate are dissolved in 0.7 cc. of purest methanol and treated with 0.9 cc. of sodium periodate solution. (This solution is prepared as follows: 1.25 gm. of $Na_2H_3IO_6$ are suspended in about 70 cc. of water and treated with shaking with 2 N-sulfuric acid until the reaction is distinctly acid to litmus, whereupon the whole is made up with water to 100 cc.) After one hour long needles are formed. After standing for two hours, the methanol is evaporated under vacuum and the residue extracted by shaking first with 1 cc. of chloroform, then with 7 cc. of chloroform-ether (1:3) and finally twice, in each case with 6 cc. of chloroform-ether (1:3). The organic solvents are then washed at about 0° C. twice with 0.6 cc. of sodium carbonate solution and twice with 0.6 cc. of water, then dried over sodium sulfate and evaporated under vacuum. The crystalline neutral portion thus obtained amounts to 3.17 mg. and constitutes the 20:18 lactone of the 18:11 cyclo-semiacetal of $\Delta^4$-3:18-dioxo-11$\beta$-hydroxy-aetienic acid of the formula.

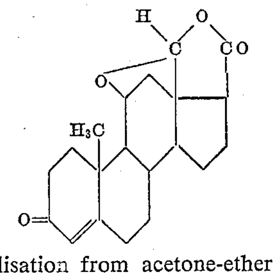

After recrystallisation from acetone-ether it is obtained in the form of colorless pointed prisms or leaflets of M.P. 307–313° C. (with brown coloration); $[\alpha]_D^{25} = +121.2° \pm 2°$ (c.=0.9154 in chloroform). By concentration of the mother liquor, a further quantity of the above lactone can be obtained, which after sublimation under 0.03 mm. pressure and at 192–210° C. melts at 307–313° C.

For the isolation of the acid formed in the oxidation, the aqueous sodium carbonate solutions obtained as above are treated at 0° C. with 1.4 cc. of 2 N sulfuric acid until the whole is just acid to Congo red and then extraction carried out three times by shaking with 7 cc. of chloroform-ether (1:3) each time. The product is then in turn washed three times with 0.5 cc. of water each time, dried over sodium sulfate and the solvent evaporated. The crystalline residue amounts to 0.45 mg. and constitutes the crude $\Delta^4$-3:18-dioxo-11β-hydroxy-aetienic acid of the formula:

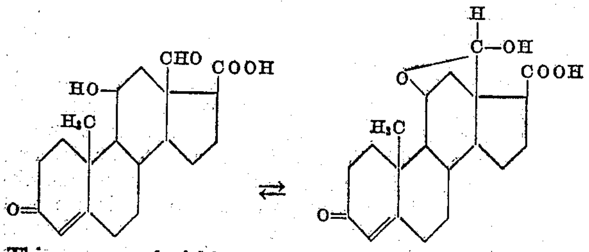

This compound yields, on recrystallisation from acetone-ether, short colorless prisms which on heating under the microscope are converted at about 220–240° C. into transparent leaflets which melt at about 295–303° C. with brown coloration.

Detection of the formaldehyde formed in the above reaction: The sulfuric acid aqueous solutions obtained above are adjusted with 0.2 cc. of 2 N sodium carbonate solution to a pH of about 5–6 and then evaporated to complete dryness under 80 mm. pressure and at 60° C. The distillate is treated with 5 mg. of dimedone and 0.5 cc. of glacial acetic acid, heated for one hour to 100° C. and left to stand for 16 hours at about 18° C. The separated crystals, after filtration with suction and washing with water, amount to 0.66 mg., melt at 192–195° C. and constitute the formaldehyde-dimedone derivative. From the acetic acid aqueous solution, by extraction with ether, a further quantity can be isolated.

*Example 17*

0.4 mg. of the $\Delta^4$-3:18-dioxo-11β-hydroxy-aetienic acid described in Example 16 are sublimed in a small flask under 0.03 mm. pressure and at 210–230° C. The sublimate is dissolved in 2.5 cc. of chloroform and 7.5 cc. of ether and washed with 0.5 cc. of 2 N sodium carbonate solution, 0.5 cc. of water, 0.3 cc. of 2 N sodium carbonate solution and then three times with 0.3 cc. of water each time. These solutions are further treated in a second separating funnel with 4 cc. of chloroform-ether. The chloroform-ether solutions are combined, dried over sodium sulfate and give after evaporation 0.3 mg. of neutral residue which constitutes the 20:18-lactone of the 18:11-semiacetal of the $\Delta^4$-3:18-dioxo-11β-hydroxy-aetienic acid, described in Example 16.

*Example 18*

9.692 mg. of the 20:18-lactone of the 18:11-cyclo-semiacetal of the $\Delta^4$-3:18-dioxo-11β-hydroxy-aetienic acid, described in Examples 16 and 17, are hydrogenated in glacial acetic acid solution in the presence of 5 mg. of prehydrogenated platinum oxide. After 7 minutes 1.235 cc. (calculated quantity 1.32 cc.) of hydrogen have been taken up and the hydrogenation is interrupted. The hydrogenation product (10.2 mg.) obtained after working up, consists for the most part of colorless leaflets of M.P. 222–255° C. (with decomposition) and constitutes a mixture of the 20:18-lactones, isomeric in 5-position, of the 18:11-cyclo-semiacetals of the 3:11-di-hydroxy-18-oxo-acetienic acid of the formula:

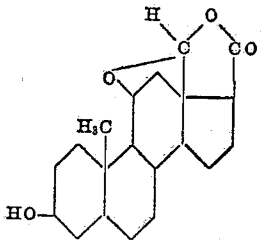

By treatment with a mixture of acetic anhydride and pyridine there is obtained the 20:18-lactone of the 18:11-cyclosemiacetal of 3β-acetoxy-11β-hydroxy-18-oxo-aetianic acid which crystallizes from methanol in the form of flat needles melting at 218–225° C.; $[\alpha]_D^{25}=0°$ (c.=0.5246 in chloroform).

The non-acetylated mixture can be converted into the known 3:11-diketo-alloaetianic acid methyl ester in the following manner:

The above hydrogenation product (10.2 mg.) is heated in a mixture consisting of 0.03 cc. of hydrazine hydrate and a solution of 12 mg. of sodium in 0.5 cc. of ethanol in an evacuated bomb tube for 13.5 hours to 148° C. After working up there are obtained 3 mg. of neutral portion and 7.8 mg. of acid constituents. The latter, after crystallisation from acetone-ether, yield 3.6 mg. of 18:11-lactone of 3β:11β-dihydroxy-alloaetianic acid-18-acid of the formula:

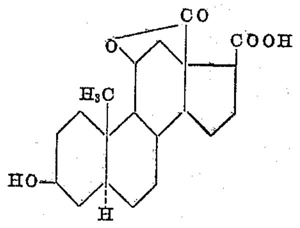

which melts at 270–275° C. (with decomposition). From the mother liquor of the acid there is obtained a further 1.1 mg. of substance of M.P. 252–268° C. (with decomposition). The residue of the acid fraction (3.2 mg.) is amorphous.

The amorphous acid (3.2 mg.) is esterified with diazomethane and the methyl ester thus obtained is oxidized in glacial acetic acid solution with 2 mg. of chromium trioxide. After two hours, the oxidation is interrupted, the reaction solution worked up and the crude product chromatographed over 300 mg. of aluminium oxide. From the crystallized fractions, after recrystallisation of ether-pentane, crystals are obtained of M.P. 205–212° C., which are identical with known 3:11-dioxo-alloaetianic methyl ester.

From the neutral portion, the 20:18-lactone of 3β:11β:18-trihydroxy-alloaetianic acid of the formula:

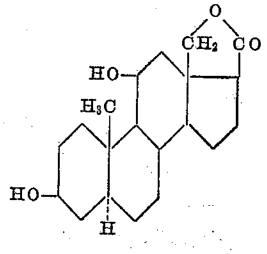

can be isolated.

*Example 19*

The 18:11-lactone of the 3β:11β-dihydroxy-alloaetianic acid-18-acid (4.7 mg.) obtained according to Example 18, is esterified with diazomethane and the crude product recrystallized from acetone-ether. The resulting 18:11-lactone of 3β:11β-dihydroxy-alloaetianic acid methyl ester-18-acid of the formula:

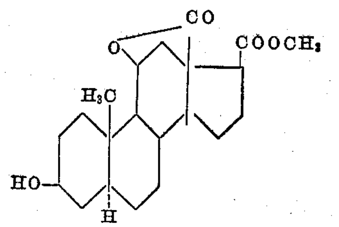

melts at 232–236° C.; $[\alpha]_D^{25}=+81.5°\pm6°$ (c.=0.362 in chloroform).

3.5 ml. of the above lactone-methyl ester are dissolved in 0.4 cc. of purest glacial acetic acid and treated with 0.09 cc. of 2% chromium trioxide solution in glacial acetic acid. After two hours (some chromium trioxide can still be detected in the reaction solution) the oxidation is interrupted by addition of methanol, then water added and the oxidation product isolated by extraction by shaking with chloroform-ether. It crystallizes from acetone-ether-pentane in hexagonal leaflets (2.8 mg) and melts at 209–211° C.; $[\alpha]_D^{25}=+101°\pm8°$ (c.=0.2528 in chloroform) and constitutes the 18:11-lactone of 3-oxo-11β-hydroxy-alloaetianic acid methyl ester-18-acid of the formula:

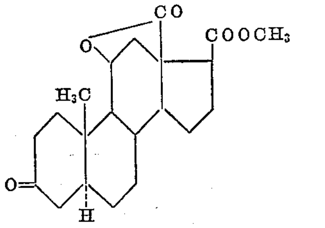

The above 3β-hydroxy-lactone-methyl ester on acetylation with acetic anhydride-pyridine yields the 18:11-lactone of 3β-acetoxy-11β-hydroxy-alloaetianic acid methyl ester-18-acid. It crystallizes from a mixture of methanol and acetone in the form of rhombic leaflets melting at 194–195° C.; $[\alpha]_D^{26}=+64.1°$ (c.=0.4836 in chloroform).

*Example 20*

1.267 mg. of aldosterone monoacetate of M.P. 190–192° C. are dissolved in 0.12 cc. of glacial acetic acid and treated with 0.01 cc. of 2% chromium trioxide-glacial acetic acid solution. After 15 minutes the chromium trioxide is consumed and a further 0.01 cc. of the same solution is added. After 3½ hours a little methonal is added to the reaction solution and the whole allowed to stand for a further hour and then evaporate under vacuum at 30° C. The residue is taken up in chloroform-ether (1:3), washed at 0° C. twice with 0.15 cc. of N-sodium carbonate solution each time and twice with 0.1 cc. of water each time, the chloroform-ether solution dried and evaporated under vacuum. The neutral portion is recrystallized twice from acetone-ether and washed with ether and pentane. The melting point of the resulting 18:11-lactone of $\Delta^4$-3:20-dioxo-11β-hydroxy-21-acetoxy-pregnene-18-acid of the formula:

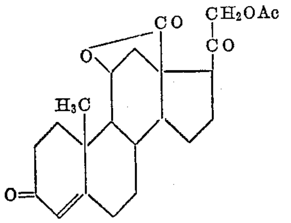

which occurs in colorless leaflets (also in part in clusters), is 187–190° C.

After further crystallization from a mixture of chloroform and ether this compound melts at 198–199° C. (flat needles); $[\alpha]_D^{26}=+117.2°$ (c.=0.6186 in chloroform).

For hydrolysis of the acetate group, 6.3 mg. of the above compound are dissolved in 1 cc. of methanol, a solution of 7 mg. of potassium bicarbonate in 0.24 cc. of water are added and the whole is allowed to stand at 18° C. for 48 hours. After acidification with dilute hydrochloric acid it is extracted with a mixture of chloroform and ether (1:3), the extract washed first with water, then with sodium bicarbonate solution and again with water, dried, and the solvent evaporated under reduced pressure. The neutral portion so obtained amounts to 3.5 mg. and is the 18.11-lactone of $\Delta^4$-3.20-dioxo-11β.21-dihydroxy-pregnene-18-acid. After recrystallization from a mixture of acetone and ether it forms small grains which melt at 203–218° C.

For oxidatively splitting the ketal group, 5.8 mg. of this last-mentioned compound are dissolved in 0.6 cc. of methanol, mixed with 1.2 cc. of a sodium periodate solution prepared according to Example 16, and allowed to stand at 20° C. for 1¼ hours. The reaction mixture is then rendered slightly acid to Congo and extracted with a mixture of chloroform and ether (1:3). After washing the extract with dilute sodium carbonate solution and water, drying, and evaporating the solvent, there are obtained 3 mg. of a neutral portion. To obtain the acid formed in the oxidation, the sodium carbonate solutions are acidified and extracted with a mixture of chloroform and ether (1:3). The chloroform-ether solution, after being washed with water, yields on drying and evaporation 2.8 mg. of the 18.11-lactone of the $\Delta^4$-3-oxo-11β-hydroxy-aetienic acid-18-acid of the formula

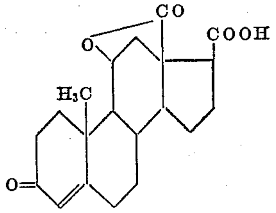

which is obtained in the form of fine grains melting at 310–320° C. after crystallisation from a mixture of acetone and ether. By methylation by means of diazomethane and recrystallisation from a mixture of acetone and ether there is obtained the corresponding methyl ester of melting point 219–225° C. (prisms).

The above mentioned acid melting at 310–220° can be hydrogenated according to the directions given in Example 18. By this means there is obtained the 18:11-lactone of 3β:11β-dihydroxy-alloaetianic acid-18-acid of M.P. 270–275° C. (with decomposition), described in Example 18.

1.7 mg. of the above-described 18:11-lactone of the $\Delta^4$-3-oxo-11β-hydroxy-aetienic acid methyl ester-18-acid of melting point 219–225° C. are dissolved in 1.5 cc. of glacial acetic acid and hydrogenated at 22° C. in the presence of 1.5 mg. of platinum oxide. When the hydrogenation ceases the catalyst is removed by filtration, the filtrate evaporated under reduced pressure and the residue taken up in a mixture of chloroform and ether (1:3). The chloroform-ether solution is then washed twice with water, dried and evaporated in vacuo. The crude residue amounts to 1.7 mg. and melts at 210–230° C. after recrystallisation from a mixture of acetone and ether. On further recrystallizing, the melting point rises to 232–236° C. This compound is identical with the 18,11-lactone of 3β,11β-dihydroxy-alloaetianic acid methyl ester-18-acid described in Example 19.

*Example 21*

7 mg. of aldosterone hydrate are dissolved in 0.7 cc. of methanol and treated with 1.28 cc. of sodium periodate solution (prepared according to Example 16). After only a few minutes, the separation of crystal needles commences. After 2 hours the methanol is removed under vacuum at 20° C. Then at 0° C., with 2 N-$H_2SO_4$ a just distinctly acid reaction to Congo red is established and the whole extracted by shaking three times, in each case with 10 cc. of chloroform-ether (1:3). (For the working up of the aqueous phase see below.)

The three extracts are washed in turn by means of the following solutions: 1 cc. of water, 1 cc. of 0.2 N-sodium carbonate, 0.5 cc. of water, 1 cc. of sodium carbonate solution and twice with 0.5 cc. of water each time. The solutions, dried over sodium sulfate, give on evaporation 6.7 mg. of neutral constituents. The combined water and sodium carbonate extracts are acidified with sulfuric acid and extracted by shaking with chloroform-ether (1:3). (For the working up of the acid aqueous phase see below.) The extracts washed with a little water and dried over sodium sulfate give on evaporation 0.4 mg. of $\Delta^4$-3:18-dioxo-11β-hydroxy-aetienic acid (see Example 16).

The 6.7 mg. of neutral constituents give from acetone-ether 4.5 mg. of the 20:18-lactone, described in Example 16, of the 18:11-cyclosemiacetal of $\Delta^4$-3:18-dioxo-11β-hydroxy-aetienic acid of M.P. 309–315° C. (with decomposition). The mother liquors, after distillation in a small flask or after chromatography over alumina, give a further quantity of the same compound.

Detection of the formaldehyde formed in the oxidation: The two acid aqueous phases, after extraction with chloroform-ether, are combined, brought to pH=5 with sodium carbonate solution and distilled to dryness under 80 mm. pressure and at 60° C. bath temperature. The distillate is subjected to repeated distillation. The distillate thus purfied is treated with 5 mg. of dimedone and 0.3 cc. of glacial acetic acid, heated for 1 hour to 100° C. and allowed to stand for 12 hours at 0° C. 0.66 mg. of needles of M.P. 192–194° C. crystallize. The mother liquor is extracted with ether. The solution, washed with a little water and dried over sodium sulfate, is evaporated and the residue chromatographed over 0.2 g.m. of Mg-silicate-kieselguhr (Celite No. 545) (2:1). The fractions eluted with benzene (0.8 mg.) give from ether-pentane a further small quantity of formaldehyde-dimedone compound (M.P.= about 180° C.). The fractions elutable with benzene-ether and pure ether give free dimedone, M.P. 130–135° C.

The combined crystals of the formaldehyde compound are sublimed in a small flask under 0.02 mm. pressure and at 105–115° C. The sublimate gives from ether-pentane colorless crystals of M.P. 192–194° C. A known sample of formaldehyde-dimedone and a mixture of the two substances both melt at the same temperature. The infra-red spectra are also the same.

*Example 22*

69 mg. of crude aldosterone-hydrate are dissolved in 6 cc. of methanol and allowed to stand for 1½ hours with 12 cc. of sodium periodate solution. Working up by a method analogous to the directions of Examples 16 and 21 gives 21 mg. of the $\Delta^4$-3:18-dioxo-11β-hydroxy-aetienic acid described in Example 16 and 37.8 mg. of a neutral fraction. The latter gives from acetone-ether 4.7 mg. of crude 20:18-lactone of the 18:11-cyclosemiacetal of $\Delta^4$-3:18-dioxo-11β-hydroxy-aetienic acid of M.P. 285–305° C. (with decomposition).

In an analogous manner there are obtained from 195 mg. of crude aldosterone-hydrate 95 mg. of the $\Delta^4$-3:18-dioxo-11β-hydroxy-aetienic acid described in Example 16 and 76 mg. of a neutral fraction. The latter yields from acetone-ether 15 mg. of the above described lactone of M.P. 303–312° C. (with decomposition).

The mother liquors from the lactone obtained in these two cases are distilled in a small flask under 0.02 mm. pressure. The fractions passing over up to 195° C. bath temperature are discarded. The distillate obtained from 195–230° C. gives from acetone-ether a further quantity of about 0.7 mg. of crystalline lactone of M.P. 275–295° C. Chromatography of the remaining mother liquors over alumina (alkali free) including elution with petroleum ether-benzene and pure benzene, gives fractions containing only further traces of the crystalline lactone.

The not quite pure fractions of the crystalline lactone are sublimed in a small flask under 0.02 mm. pressure and at 210–230° C. bath temperature. The sublimate gives from acetone-ether directly pure crystals of M.P. 307–311° C. (with decomposition).

*Example 23*

1.9 mg. of aldosterone-hydrate are dissolved in 0.05 cc. of purest glacial acetic acid and treated with 0.0165 cc. of 2% chromium trioxide-glacial acetic acid solution (equals 0.33 mg. of $CrO_3$). A yellow brown precipitate ($CrO_3$-complex) is immediately produced which dissolves only gradually. The chromium-trioxide becomes spent after about 2 minutes and then consecutively four equal portions of chromium trioxide solution are further added (total therefore 1.65 mg. $CrO_3$=5.0 equivalents). The first of these portions becomes spent after 5 minutes, the second after 10 minutes and the third after 45 minutes, whereas the fourth is not completely consumed after a further 1½ hours. The whole is then evaporated under vacuum at 30° C., treated with water and 3 drops of 2 N-sulfuric acid and extracted with chloroform-ether (1:3). The separation according to the directions of Examples 16 and 21 yields a trace of acid and 1.8 mg. of neutral constituents, the latter giving from acetone-ether 0.9 mg. of colorless granules of M.P. 298–310° C. This compound can likewise be sublimed without decomposition under 0.01 mm. pressure and at 200–230° C. By a mixed melting point test and a paper chromatogram, it is proved to be identical with the lactone described in Examples 16, 21, and 22. The polarity in the $B_5$-system of Bush is about the same as or a little higher than adrenosterone. In the formamidecyclohexane-benzene-(1:1) system at 40° C. $R_F$=0.34 (adrenosterone $R_F$=0.59).

*Example 24*

7.3 mg. of 21-monoacetyl-aldosterone of M.P. 198–199° C. are dissolved in 0.7 cc. of purest glacial acetic acid and treated with 0.055 cc. of 2% chromium trioxide solution (=1.1 mg. $CrO_3$), which becomes spent after 25 minutes at 20° C. Another 0.030 cc. of the same solution (=0.6 mg. $CrO_3$) is then added which after a further 45 minutes also becomes spent. A third addition of 0.030 cc. (=0.6 mg.) is unconsumed after a further 1½ hours. The whole is treated with 1 drop of methanol and allowed to stand for a further 2 hours. Working up according to the directions of Example 21 gives no acid constituents but 7.3 mg. of a neutral crude product. From acetone-ether 6.4 mg. of crystals of M.P. 196–199° C. and 0.1 mg. of M.P. 194–197° C. are obtained. Recrystallization from acetone-ether gives long, narrow hexagonal leaflets of M.P. 198–200° C. and repeated recrystallization from methanol-ether gives 5.5 mg. of hexagonal (to some extent having rhombic bounding surfaces) leaflets of M.P. 193–194° C.

$$[\alpha]_D^{24}=+117.2°\pm3°$$

(c.=0.6186 in chloroform). Reduction test: positive; ultra violet absorption: positive. In a paper chromatogram (propylene glycol-toluene) this compound migrates in the same way as 11-dehydro-21-acetyl-corticosterone. This compound constitutes the 18:11-lactone, described in Example 20, of the $\Delta^4$-3:20-dioxo-11β-hydroxy-21-acetoxy-pregnene-18-acid.

*Example 25*

20.1 mg. of the 20:18-lactone, described in Example 16, of the 18:11-cyclosemiacetal of $\Delta^4$-3:18-dioxo-11β-hydroxy-aetienic acid of M.P. 304–310° C. (with decomposition) are hydrogenated in 2 cc. of glacial acetic acid with 1.75 mg. of previously hydrogenated $PtO_2$. The absorption of hydrogen is complete after 50 minutes (3.3 cc. $H_2$ absorbed at 22.4° C. under 731 mm. pressure corresponding to 2.14 mol). The crude hydrogenation product is allowed to stand for 16 hours at 20° C. in 0.2 cc. of acetic anhydride and 0.3 cc. of absolute pyridine. The whole is then evaporated under vacuum at 40° C., taken up in chloroform-ether (1:3), washed, in each case using 0.3 cc., with dilute hydrochloric acid, water, potassium bicarbonate solution and water (twice), dried over sodium sulfate and evaporated. The residue (20 mg.) gives from a little acetone-ether (about 1:10) 8 mg. of fine needles of M.P. 199–220° C. Purification is best effected by dissolving in acetone-ether (1:1), adding methanol and concentrating to a considerable extent, as a result of which the remaining solvent is practically pure methanol. 4.2 mg. of flat needles result, which on heating are converted at about 219° C. into thin long needles of M.P. 222–226° C. This compound is the 20:18-lactone, described in Example 18, of the 18:11-cyclosemiacetal of 3β-acetoxy-11-β-hydroxy-18-oxo-aetianic acid.

*Example 26*

9.2 mg. of the 20:18-lactone, described in Examples 18 and 25, of the 18:11-cyclosemiacetal of 3β-acetoxy-11β-hydroxy-18-oxo-aetianic acid of M.P. 218–225° C. are heated in a small bomb tube with 0.12 cc. of hydrazine hydrate for 1½ hours to 100° C. while the tube is open. Then a solution of 11 mg. of sodium in 0.5 cc. of ethanol is added and the tube is sealed while under 80 mm. pressure and heated for 14 hours to 151° C. After cooling, the alcohol is removed under vacuum and the residue treated with a little water and extracted by shaking three times, in each case with 10 cc. of choloroform-ether. The extracts washed with water and dried over sodium sulfate leave on evaporation 0.8 mg. of residue (neutral fraction).

The aqueous phase and the wash waters, at 0° C., are brought to pH=1 with hydrochloric acid and again extracted three times by shaking with chloroform-ether (1:3). These three extracts are washed consecutively in counter current, using 0.3 cc. in each case, with the following liquids: water, 2 N-sodium carbonate solution, water, 2N-sodium carbonate solution, water, water. Drying over sodium sulfate and evaporation give 1.4 mg. of a residue of the 20:18-lactone, described in Example 18, of 3β:11β:18-trihydroxy-alloaetianic acid, which compound partially crystallises.

The sodium carbonate extracts and wash waters are combined, treated at 0° C. with hydrochloric acid until the reaction is acid to Congo red and again extracted with chloroform-ether. The extracts, washed with water and dried over sodium sulfate, give on evaporation 6.7 mg. of residue (acids).

Separation of the acids: The 6.7 mg. of acid mixture gives from acetone-ether in two fractions 4.5 mg. of crystals of melting point 251–268° C. and as a third fraction 0.5 mg. of melting point 235–265° C. As in this case purification is a difficult matter, the combined crystals (5 mg.) and the residue from the mother liquors (1.7 mg.) are esterified with diazomethane.

The 5 mg. of crystalline acid give 5.1 mg. of crude methyl ester. Recrystallization from acetone-ether yields a mixture of coarse prisms and fine needles. The latter can be washed out with ether-pentane. By careful fractionation and repeated recrystallization 1.7 mg. are obtained of coarse prisms of M.P. 232–237° C. of the 18:11-lactone, described in Example 19, of the 3β:11β-dihydroxyalloaetianic acid methyl ester-18-acid. The remaining mother liquors (3.4 mg.) are combined with the methyl ester mixture (1.8 mg.) from the 1.7 mg. of residue from the mother liquors of the crystalline acid. This combined material (5.2 mg.) serves for acetylation (see below).

The 1.7 mg. of the above methyl ester of M.P. 232–237° C. are allowed to stand for 16 hours at 20° C. with 15 mg. of absolute pyridine and 10 mg. of acetic anhydride. The customary working up yields 1.9 mg. of crude product. From a little acetone with ether crystals are obtained of M.P. 185–194° C. (18:11-lactone of 3β-acetoxy-11β-hydroxyalloaetianic acid methyl ester-18-acid).

Separation of the methyl ester mother liquors: The 5.2 mg. of methyl ester mother liquors are acetylated as described above and the acetate mixture (5.6 mg.) chromatographed over 500 mg. of alumina.

The fractions 1–12 (eluted with petroleum ether-benzene rising to 50% benzene content) give only a little residue and at the most traces of crystals.

Fraction 15 (eluted with pure benzene) gives from ether-pentane few flattened, doubly pointed needles of a secondary product of M.P. 198–201° C. The mother liquor is combined with fractions 13–14 and gives from a little ether with pentane few thick parallelepipeds of M.P. 182–185° C.

Fractions 16–18 (eluted with pure benzene and benzene-ether (95:5)) give from ether-pentane 1.018 mg. of pure 18:11-lactone of 3β-acetoxy-11β-hydroxy-alloaetianic acid methyl ester-18-acid of M.P. 190–195° C. and from the mother liquor a further small quantity of the same compound of M.P. 180–191° C.

Fraction 19 gives a little of a crystal mixture of M.P. 172–186° C.

Fractions 20–26 (eluted with benzene-ether of 10–50% ether content) give from ether-pentane 0.970 mg. of practically pure 3β-acetoxy-11β-hydroxy-alloaetianic acid methyl ester of M.P. 193–202° C. and from the mother liquor a further 0.083 M.P. of the same compound of M.P. 188–200° C.

*Example 27*

19.1 mg. of a residue from the mother liquor of the pure 20:18-lactone of the 18:11-cyclosemiacetal of 3β-acetoxy-11β-hydroxy-18-oxo-aetianic acid are heated for 2 hours to 100° C. with 0.3 cc. of hydrazine hydrate and after the addition of 25 mg. of sodium in 1 cc. of ethanol, heated for 17 hours to 151° C. Working up as in Example 26 gives 4.5 mg. of a neutral fraction, 4.4 mg. of the 20:18-lactone, described in Example 18, of 3β:11β:18-trihydroxy-alloaetianic acid and 8.5 mg. of acids. The 8.5 mg. of acids are methylated (9.3 mg.) and acetylated (10.2 mg.). The resulting material is chromatographed (40 fractions) over 1 gm. of alumina.

From fractions 13–24 2.7 mg. of crude 18:11-lactone of 3β-acetoxy-11β-hydroxy-alloaetianic acid methyl ester-18-acid of M.P. 185–193° C. are obtained.

Fractions 25–27 give a little impure 18:11-lactone of 3β-acetoxy-11β-hydroxy-alloaetianic acid methyl ester-18-acid of M.P. 182–192° C.

Fractions 28–38 give 1.6 mg. of pure 3β-acetoxy-11β-hydroxy-alloaetianic acid methyl ester of M.P. 192–199° C.

*Example 28*

5.8 mg. of the 20:18-lactone, described in Examples 16, 26 and 27, of 3β:11β:18-trihydroxy-alloaetianic acid are dehydrogenated with chromium trioxide in glacial acetic acid, until at 20° C. no more chromium trioxide is consumed. The customary working up gives 4.4 mg. of a neutral crude product which is chromatographed over 0.3 gm. of alumina. The fractions (0.4 mg.) eluted with ether-methanol (8–50% methanol content) crystallize. Double recrystallization from acetone-ether yields colorless fine needles combined in clusters, of M.P. 275→290° (with conversion into coarse needles) consisting of the 20:18-lactone of 3:11-dioxo-18-hydroxy-alloaetianic acid of the formula:

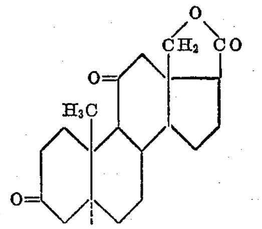

The above examples clearly demonstrate that according to the process of the invention either aldosterone or its functional derivatives or intermediates which are convertible into these compounds are obtained. Thus the compounds of the invention can be used as medicaments having the activity of hormones of the adrenal glands or as intermediates for the production of such medicaments.

What is claimed is:

1. A process which comprises reacting the $\Delta^5$-3:18-bis-ethylenedioxy-11β-trifluoracetoxy-etienic acid chloride with diazomethane.

2. A process which comprises reacting $\Delta^5$-3:18-bis-ethylenedioxy-11β-trifluoracetoxy-etienic acid chloride with diazomethane and hydrolyzing the trifluoracetoxy group of the compound obtained by treatment with an alkaline agent.

3. $\Delta^5$ - 3:18 - bis - ethylenedioxy - 11β - trifluoracetoxy-20-keto-21-diazo-pregnene.

4. $\Delta^5$ - 3:18 - bis - ethylenedioxy - 11β - hydroxy - 20-keto-21-diazo-pregnene.

5. A process which comprises reacting a member selected from the group consisting of an acid halide of the formula:

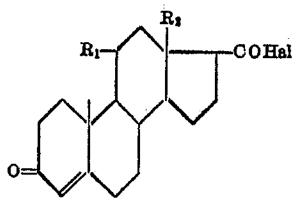

wherein $R_1$ represents a member selected from the group consisting of a free hydroxyl group and a hydroxyl group esterified with a lower aliphatic carboxylic acid, $R_2$ an aldehyde group acetalized with a lower alkanediol and Hal is a halogen atom, and a 3-lower alkylene ketal of such halide, with an excess of a diazomethane solution and treating the resulting diazo ketone with a member selected from the group consisting of water, an aqueous inorganic acid, an aqueous organic carboxylic acid and an anhydrous organic carboxylic acid.

6. A member selected from the group consisting of a compound of the formula:

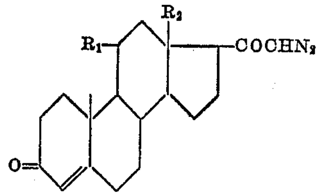

and a 3-lower alkylene ketal thereof, wherein $R_1$ represents a member of the group consisting of a free hydroxyl group and a hydroxyl group esterified with a lower aliphatic carboxylic acid and $R_2$ is a member of the group consisting of an aldehyde group and an aldehyde group acetalized with a lower alkanediol.

7. A process of claim 5 wherein the aldehyde group acetalized with a lower alkanediol in the resulting diazo ketone is hydrolyzed to the free aldehyde.

8. A compound of claim 6 wherein $R_1$ is a hydroxyl group esterified with trifluoroacetic acid.

References Cited in the file of this patent

Helv. Chem. Acta., vol. 37 (1954), June 15, 1954, pages 1163–1223.

UNITED STATES PATENT OFFICE

Certificate of Correction

Patent No. 2,904,545 September 15, 1959

Tadeus Reichstein et al.

It is hereby certified that error appears in the printed specification of the above numbered patent requiring correction and that the said Letters Patent should read as corrected below.

Column 5, line 28, for "pregnene" read —pregnane—; line 52, for "acetianic" read —aetianic—; line 53, for "17α-" read —17a-—; columns 7 and 8, Formula VIII should appear as shown below instead of as in the patent:

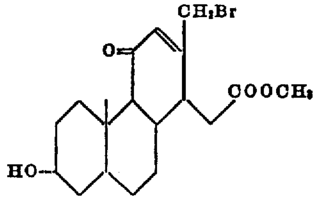

columns 9 and 10, Formula XVI should appear as shown below instead of as in the patent:

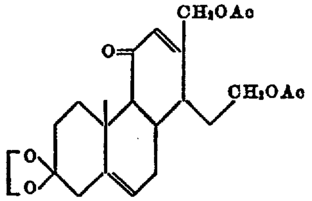

same columns 9 and 10, Formula XXVI should appear as shown below instead of as in the patent:

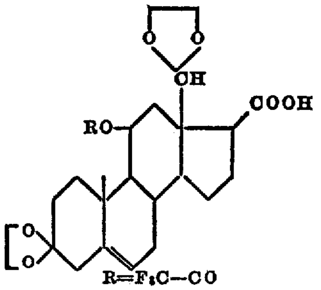

$R=F_3C-CO$ column 11, line 66, for "11:8-semi-" read —11:18-semi-—; column 14, line 12, for "-3-ethylene-dioxy-" read —-3-ethylenedioxy-—; column 16, line 2, for "$\Delta^2$17α-" read —$\Delta^2$-7α-—; line 15, for "-oxy-" read —-hydroxy-—; column 19, line 56, after "ultraviolet" insert a comma; column 20, line 47, for "18:11 cyclo-" read —18:11-cyclo-—; column 21, line 62, for "acetienic acid" read —aetianic acids—; column 22, lines 63 to 72, inclusive, the formula should appear as shown below instead of as in the patent:

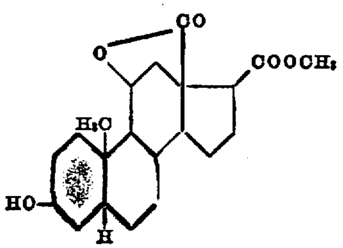

same column 22, line 75, for "3.5 ml." read —3.5 mg.—; column 23, line 74, for "18.11-lactone of $\Delta^4$-3.20-dioxo-11β.21-" read —18,11-lactone of $\Delta^4$-3,20-dioxo-11β,21-—; column 24, line 17, for "18.11-lactone" read —18,11-lactone—; line 34, for "310–220°" read —310–320°—.

Signed and sealed this 26th day of July 1960.

[SEAL]

Attest:
KARL H. AXLINE,
*Attesting Officer.*

ROBERT C. WATSON,
*Commissioner of Patents.*